United States Patent [19]
Sagata

[11] Patent Number: 5,768,231
[45] Date of Patent: Jun. 16, 1998

[54] OPTICAL DISK DRIVING METHOD AND APPARATUS

[75] Inventor: Shingo Sagata, Tamana, Japan

[73] Assignee: Matsushita Electric Industrial Co., Ltd., Osaka, Japan

[21] Appl. No.: 680,539

[22] Filed: Jul. 9, 1996

[30] Foreign Application Priority Data

Sep. 20, 1995 [JP] Japan ................................ 7-241151

[51] Int. Cl.$^6$ ............................................. G11B 19/00
[52] U.S. Cl. ............................................................ 369/50
[58] Field of Search ............................. 369/50, 54, 47, 369/48; 360/73.03, 69

[56] References Cited

U.S. PATENT DOCUMENTS 5,502,700  3/1996  Shinada ................................... 369/50

FOREIGN PATENT DOCUMENTS 62-248165  10/1987  Japan .
405089469A  4/1993  Japan .

OTHER PUBLICATIONS

Japanese Document 406076468A (Abstract Only) Mar. 1994.
Japanese Document 401069278A (Abstract Only), Mar. 1989.
Japanese Document 362266734A (Abstract Only), Nov. 1987.

*Primary Examiner*—Thang V. Tran
*Attorney, Agent, or Firm*—Stevens, Davis, Miller & Mosher, L.L.P.

[57] ABSTRACT

It is an object to provide an optical disk driving method and apparatus with the consumption power reduced. The optical disk driving apparatus includes a synchronizing clock generator 6 for generating a clock in synchronism with a reproduced signal, a synchronized state discriminator 17 for deciding if the frequency of the reproduced signal is within a synchronized range, and a spindle controller 18a for controlling the spindle to be stopped from being driven and thus left running by inertia when the frequency of the reproduced signal is decided to be within the synchronized range, but controlling the spindle to be driven so that the frequency of the reproduced signal can be pulled in the synchronized range immediately before the frequency of the reproduced signal goes out of the synchronized range. A spindle controller 18b in another example of the invention, when the frequency of the reproduced signal is decided to be out of an allowable synchronized range, controls the spindle motor 2 to be driven by the driving output with its peak-to-peak value and driving time changed in accordance with the current revolution rate so that the frequency of the reproduced signal can be pulled in the allowable synchronized range.

12 Claims, 7 Drawing Sheets

OPTICAL DISK DRIVING METHOD AND APPARATUS

BACKGROUND OF THE INVENTION

1. Field of the Invention

This invention relates to an optical disk driving method and apparatus that are used for an external storage unit of a computer for recording and/or reproducing data.

2. Description of the Related Art

The optical disk has the feature that it can record and reproduce a large amount of data with high speed. In addition, the optical disk has been rapidly widely used as a major storage medium for the multi-media system. The feature of the CD ROM as a typical example of the optical disk is that it is also utilized in small-sized, light-weight notebook type computers. As a result, researchers have endeavored to decrease the size and consumption power of the optical disk drive for driving the optical disk. A conventional CD ROM drive as an example of the optical disk drive will be described below.

Figure 7:
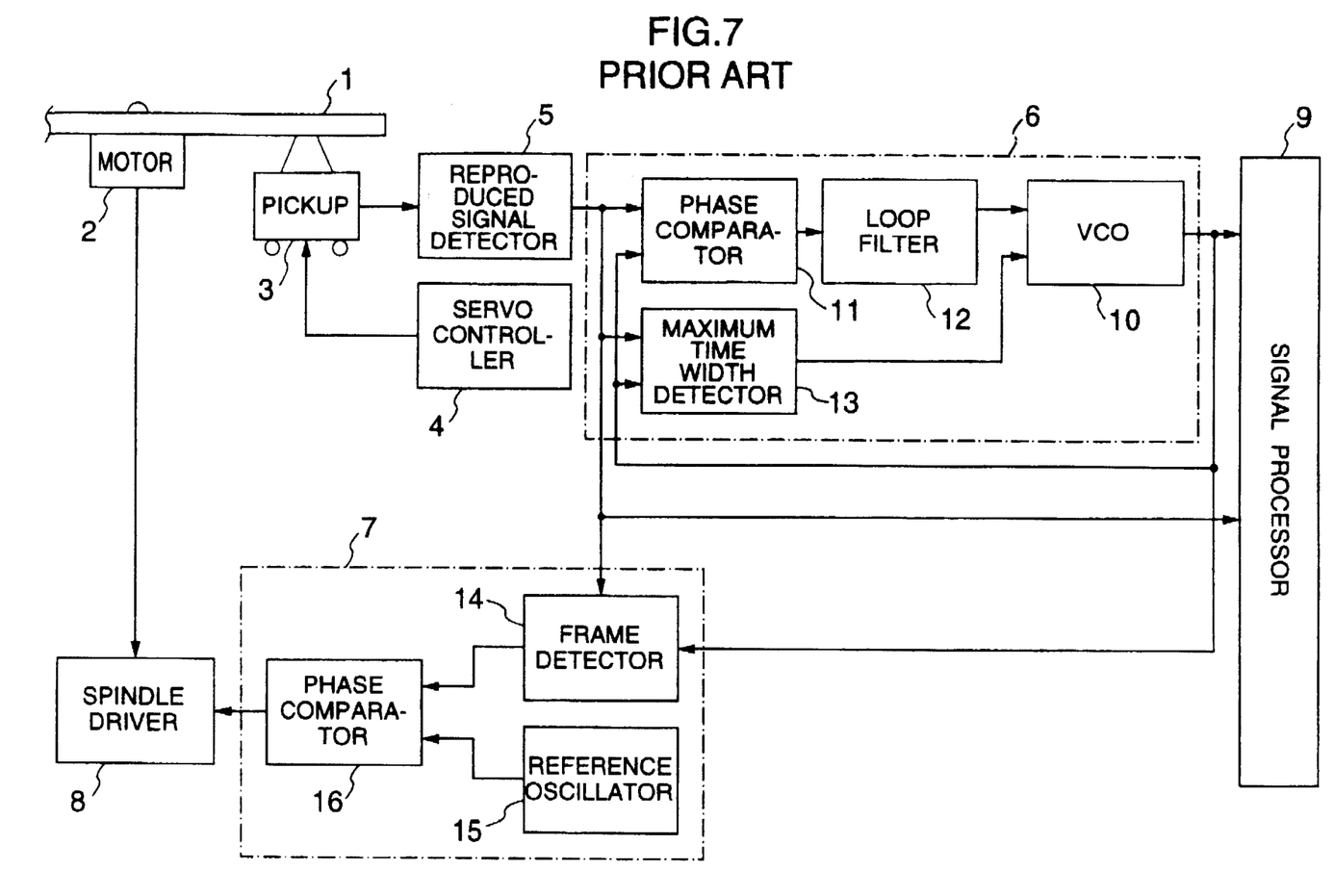
FIG. 7 is a block diagram of a conventional optical disk driving apparatus.

FIG. 7 is a block diagram of the conventional optical disk drive as a CD ROM drive. Referring to FIG. 7, there are shown an optical disk 1 on which information is recorded in trains of optical pits, a spindle motor 2 for driving the optical disk 1 to rotate, and an optical pickup 3. The optical pickup 3 is integrally formed by an optical system, a sensor and a driving system. The optical system focuses the emitted laser beam on the optical disk 1 and forms the reflected laser beam on the sensor. The sensor converts the reflected laser beam into an electric signal. The driving system moves the optical system in the radius direction and in the normal direction of the optical disk 1. There are also shown a servo controller 4 for controlling the optical pickup 3 to follow the trains of optical pits on the optical disk 1, and a reproduced signal detector 5 for converting the electric signal from the sensor of the optical pickup 3 into a binary value. In addition, there are shown a synchronizing clock generator 6 for generating a synchronizing clock in synchronism with the reproduced signal from the reproduced signal detector 5, and a rotation controller 7 for controlling the optical disk 1 (namely, spindle motor 2) to be maintained at a certain revolution speed. Moreover, there are shown a spindle driver 8 for driving the spindle motor 2 to rotate in accordance with the control signal from the rotation controller 7, and a signal processor 9 for reproducing data on the basis of the reproduced signal and the synchronizing clock, and controlling the operation of the whole optical disk drive.

The operation of this conventional optical disk drive will be described. The information signal of the optical pit trains recorded on the optical disk 1 is read out by the optical pickup 3, while the servo controller 4 is controlling the optical pickup 3 to follow the optical pit trains on the optical disk 1. The read information signal is detected and converted into a binary value by the reproduced signal detector 5. The synchronizing clock generator 6 generates a synchronizing clock in synchronism with the binary signal.

The internal construction and operation of the synchronizing clock generator 6 will be described below. The synchronizing clock generator 6 includes a phase comparator 11 for comparing the reproduced binary signal and the output from a voltage controlled oscillator (abbreviated VCO) 10 and producing a phase difference signal, and a loop filter 12 for removing the high frequency region noise from the phase difference signal, and determining the response characteristic of the whole synchronizing clock generator 6. The VCO 10 generates a clock signal of an oscillation frequency according to the output voltage from the loop filter 12. This closed loop circuit is generally called PLL (phase locked loop). If the frequency of the reproduced signal is within the synchronization pull-in range of the PLL circuit, the synchronizing clock for reproduction is generated.

The synchronizing clock generator 6 also includes a maximum time width detector 13 for detecting the maximum time width of the bit pattern of the reproduced signal. If the reproduced signal is out of the synchronization pull-in range of the PLL circuit, the maximum time width detector 13 detects the maximum time width (11-channel-clock length in CD ROM) and counts it at the clock from VCO 10. The error signal voltage according to the count is supplied to the VCO 10, changing the output oscillation frequency from the VCO 10 so that the count of the maximum time width is eleven.

Thus, even though the revolution rate of the optical disk 1 does not reach a target value, the synchronizing clock generator 6 is controlled to be within the synchronization pull-in range by the maximum time width detector 13 when it is out of the synchronization pull-in range of the PLL circuit. As a result, the PLL circuit makes pull-in operation for synchronization and generates the synchronizing clock in synchronism with the reproduced signal. Thus, even though the revolution rate of the optical disk 1 does not reach a target value, the data can be reproduced on the basis of the synchronizing clock.

The internal construction and operation of the rotation controller 7 will be described below. The optical disk 1 has recorded thereon a data train per block called frame. Each frame has at its head two continuous patterns that have the maximum time width called a frame synchronizing signal. A frame detector 14 within the rotation controller 7 detects the frame synchronizing signal from the reproduced signal at the synchronizing clock.

However, there is the possibility that the frame synchronizing signal may be detected by mistake or erroneously detected by the effect of dropout or jitter. Therefore, it is necessary to protect the frame synchronizing signal and make interpolation. Thus, a phase comparator 16 is provided to detect the phase difference between the frame synchronizing signal and the output from a reference oscillator 15 and supplies the phase difference signal to the spindle driver 8, controlling the spindle motor 2 so that the period of the frame synchronizing signal is maintained constant. As a result, the rotation controller 7 controls such that the revolution rate of the optical disk 1 can be changed continuously in response to the position of the optical pickup 3 moving on the optical disk 1. Therefore, the optical disk 1 can be precisely controlled to have a constant linear velocity at any location.

In the conventional construction, however, the spindle motor is always driven so that the optical disk can be rotated to have a constant linear velocity. This operation increases the consumption power of the optical disk drive and gives a limit to the miniaturization of the optical disk drive. Particularly, when the optical disk drive is incorporated in a portable notebook type computer or the like, it is difficult to reduce the consumption power.

Accordingly, it is an object of the invention to provide an optical disk driving method and apparatus capable of achieving the low power consumption by solving the problems in the prior art.

SUMMARY OF THE INVENTION

According to the invention, there is provided an optical disk driving apparatus including a synchronizing clock generator for generating a clock in synchronism with a reproduced signal, a synchronized state discriminator for deciding if the frequency of the reproduced signal is within the synchronized range, and a spindle controller for controlling such that when the frequency of the reproduced signal is within the synchronized range, the spindle motor is stopped from being driven, thus left running by inertia, but immediately before it becomes out of the synchronized range, the spindle motor is driven to rotate so that the frequency of the reproduced signal is forced to shift back to within the synchronized range.

Thus, according to the above construction, it is possible that when the frequency of the data reproduced from the optical disk is within the synchronized range, the spindle motor is stopped from being driven, thus left running by inertia, but immediately before it becomes out of the synchronized range, the spindle motor is driven to be accelerated, thus forced to shift back to within the synchronized range.

Therefore, the consumption power in the optical disk driving apparatus can be greatly reduced by intermittently driving the spindle motor.

DESCRIPTION OF THE PREFERRED EMBODIMENTS (Embodiment 1)

Figure 1:
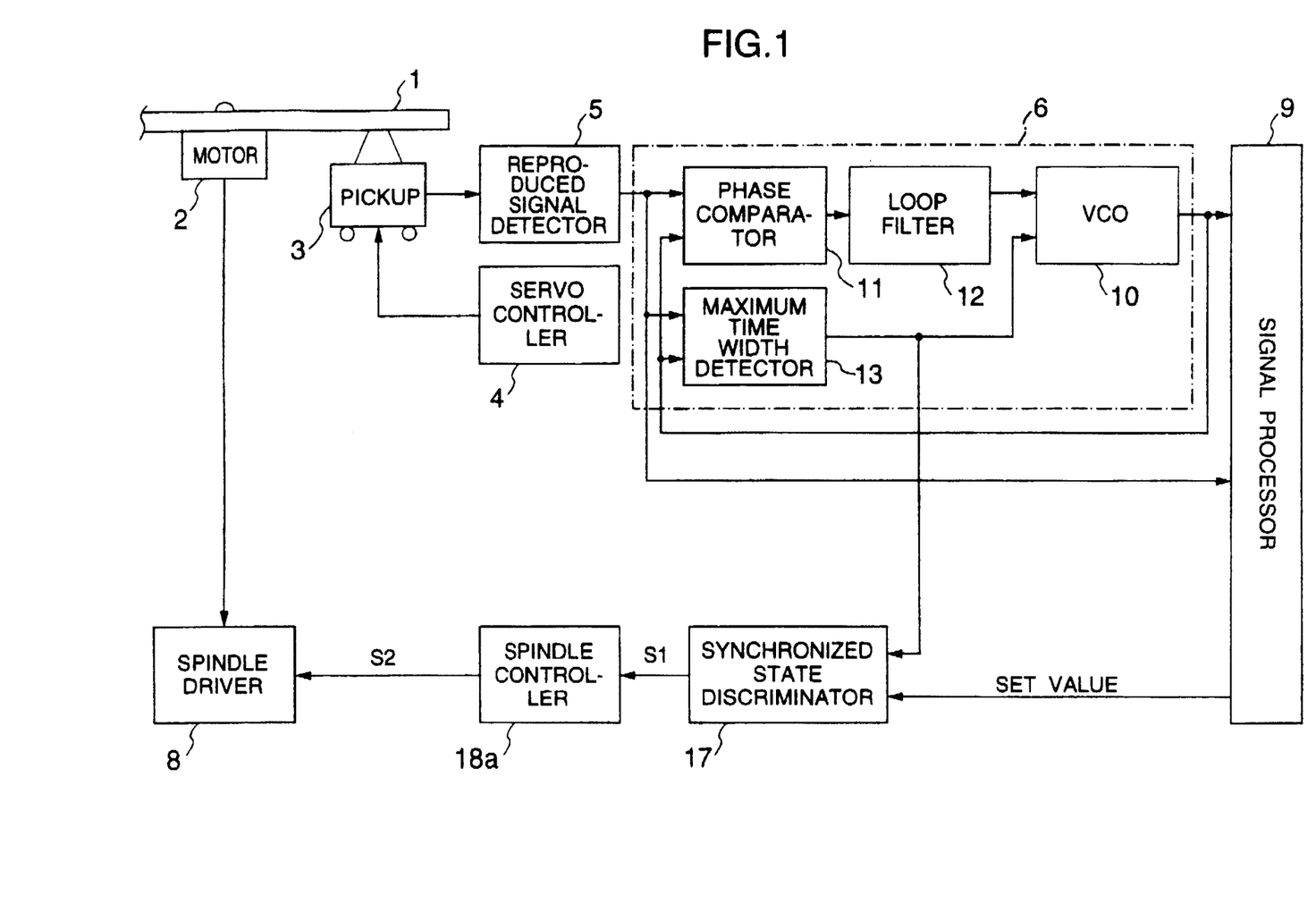
FIG. 1 is a block diagram of an optical disk driving apparatus of the first embodiment of the invention.

The first embodiment of the invention will be described with reference to drawings. FIG. 1 is a block diagram of an optical disk driving apparatus of the first embodiment of the invention. In FIG. 1, like elements corresponding to those in FIG. 7 are identified by the same reference numerals and will not be described. Referring to FIG. 1, there are shown the optical disk 1, the spindle motor 2, the optical pickup 3, the servo controller 4, the reproduced signal detector 5, the synchronizing clock generator 6, the spindle driver 8, and the signal processor 9. These elements are the same as in the conventional optical disk driving apparatus.

Shown at 17 is a synchronized state discriminator. This discriminator decides if the frequency of the reproduced signal is within a certain allowable synchronized range which is slightly narrower than the synchronized range including the margin of the operation of the whole synchronizing clock generator 6 and PLL circuit (for example, if synchronized range is designed ±50%, the allowable synchronized range is designed ±48% which depend on responsibility of VCO 10.), and it produces a command signal. There is also shown a spindle controller 18a. This controller, when receiving the command signal indicating that the frequency is within the allowable synchronized range, stops the spindle motor 2 from being driven, leaving it running by inertia. When the frequency is out of the allowable synchronized range, the controller drives the spindle motor 2 to be accelerated so that the revolution rate of the spindle motor 2 is pulled in the allowable synchronized range.

The operation of the optical disk driving apparatus of the first embodiment of the invention will be described below. The information of optical pit trains recorded on the optical disk 1 is read out by the optical pickup 3, while the servo controller 4 controls the optical pickup 3 to follow the optical pit trains on the optical disk 1. The read information is detected and converted into a binary value by the reproduced signal detector 5.

The synchronizing clock generator 6 generates a synchronizing clock in synchronism with the reproduced binary signal. The synchronizing clock generator 6 includes the PLL circuit (phase comparator 11, loop filter 12 and VCO 10) and the maximum time width detector 13, and generates the synchronizing clock for reproduction within the pull-in range of the PLL circuit. When the clock frequency is out of the synchronization pull-in range, the maximum time width detector 13 controls the clock frequency to be pulled in the synchronization pull-in range of the PLL circuit. When the PLL circuit operates to pull the frequency in the pull-in range, the synchronizing clock is also generated in synchronism with the reproduced signal.

The synchronized state discriminator 17 measures the maximum time width of the reproduced signal which is detected by the maximum time width detector 13, decides if the frequency of the reproduced signal is within the allowable synchronized range on the basis of the measured result, and compares the frequency of the reproduced signal with a set value from the signal processor 9.

Figure 2:
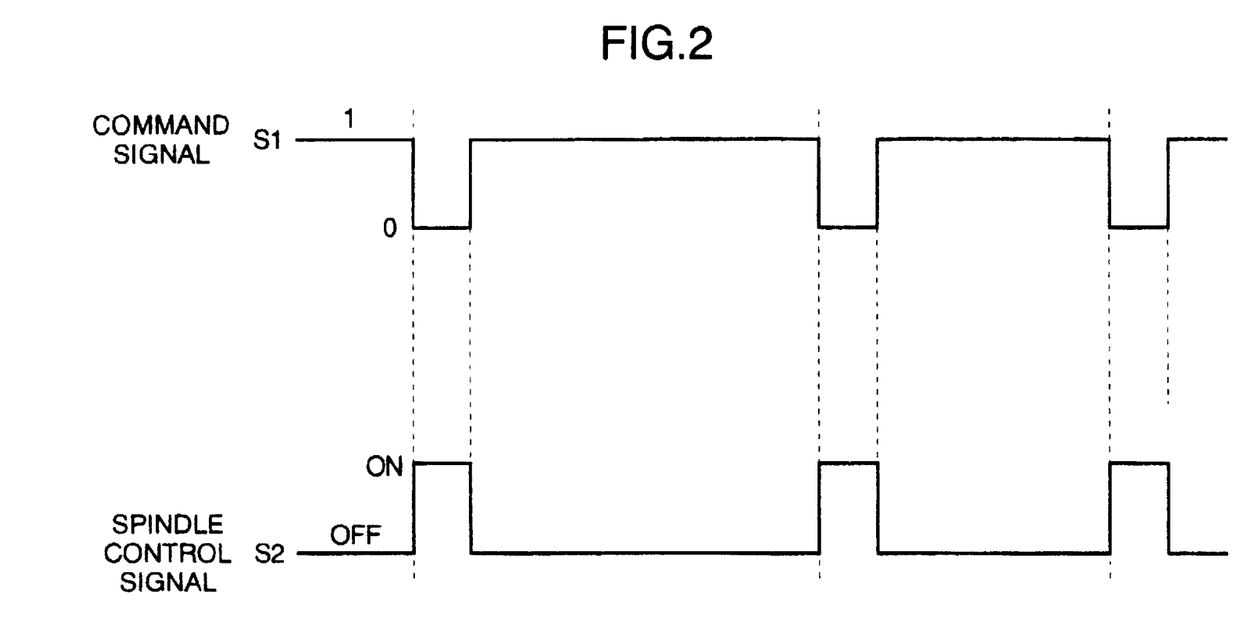
FIG. 2 is a diagram showing the relation between a command signal S1 and a spindle control signal S2.

FIG. 2 is a diagram showing the relation between the command signal S1 and the spindle control signal S2. For example, as shown in FIG. 2, the synchronized state discriminator 17 produces the command signal S1 of "1" when the frequency of the reproduced signal is within an allowable synchronized range and smaller than a set value, but produces the command signal S1 of "0" when the frequency of the reproduced signal is out of the allowable synchronized range and larger than the set value.

The spindle controller 18a is responsive to the command signal S1 to turn the spindle control signal S2 "off" when the command signal S1 is "1" and turn it "on" when the command signal S1 is "0". In other words, when the revolution rate of the optical disk 1 is within the specified value from the signal processor 9 and within the allowable synchronized range, the spindle motor 2 is stopped from being driven, thus left running by inertia, while when the revolution rate exceeds the specified value from the signal processor 9 or becomes out of the allowable synchronized range, the spindle motor 2 is driven and controlled until the optical disk 1 reaches a predetermined revolution rate.

Thus, according to the first embodiment of the invention, the consumption power can be greatly reduced by intermittently driving the spindle motor 2.

(Embodiment 2)

Figure 3:
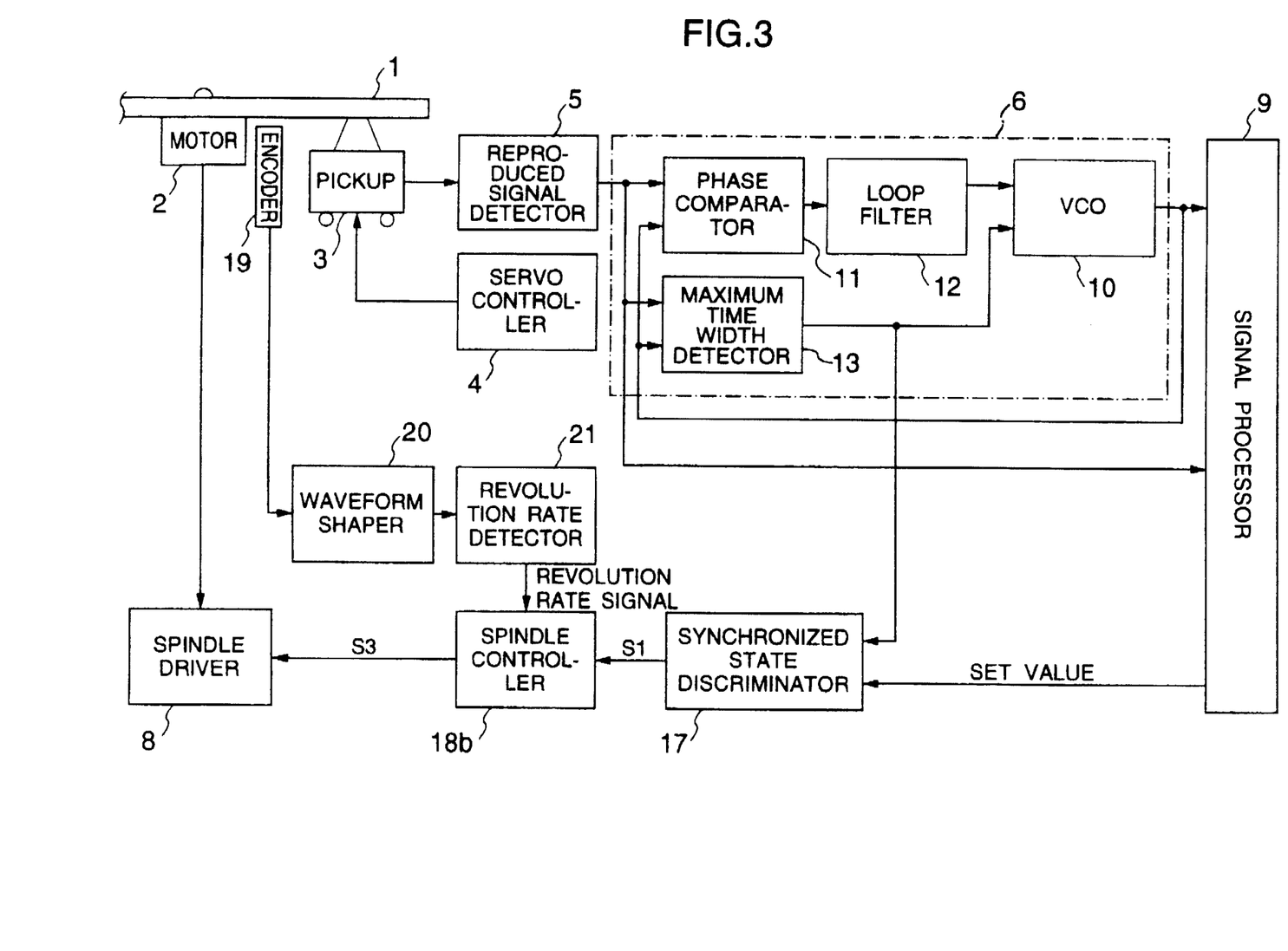
FIG. 3 is a block diagram of an optical disk driving apparatus of the second embodiment of the invention.

The second embodiment of the invention will be described below. FIG. 3 is a block diagram of an optical disk driving apparatus of the second embodiment of the invention. In FIG. 3, like elements corresponding to those in FIG. 7 are identified by the same reference numerals and will not be described. Referring to FIG. 3, there are shown the optical disk 1, the spindle motor 2, the optical pickup 3, the servo controller 4, the reproduced signal detector 5, the synchronizing clock generator 6, the spindle driver 8 and the signal processor 9. These elements are the same as in the conventional optical disk driving apparatus. In addition, there is shown the synchronized state discriminator 17 that is the same as that in the first embodiment.

In this second embodiment, the following four new elements are added. A spindle controller 18b controls the spindle motor 2 to be stopped from being driven, thus left running by inertia when the command signal S1 indicates that the frequency of the reproduced signal is within the allowable synchronized range. When the frequency is out of the allowable synchronized range, it changes the peak-to-peak value and driving time of the drive output to the spindle motor 2 in response to the present revolution rate, thereby controlling the spindle motor 2 to rotate at a revolution rate within the allowable synchronized range. An encoder 19 generates an analog rotation signal according to the rotation of the spindle motor 2. A waveform shaper 20 converts the analog rotation signal into a binary value. A revolution rate detector 21 detects the revolution rate of the spindle motor 2 from the binary rotation signal.

The operation of the optical disk driving apparatus of the second embodiment of the invention will be described. Similarly as in the first embodiment, the information on the optical disk 1 is read out by the optical pickup 3, while the servo controller 4 controls the optical pickup 3 to follow the optical pit trains. The read information is converted into a binary value by the reproduced signal detector 5, and the synchronizing clock generator 6 generates the synchronizing clock in synchronism with the reproduced signal.

Similarly as in the first embodiment, the synchronizing clock generator 6 generates the synchronizing clock for reproduction when the frequency of the reproduced signal is within the pull-in range of the PLL circuit. When the frequency is out of the synchronization pull-in range, the maximum time width detector 13 of the synchronizing clock generator 6 controls such that the frequency is pulled in the synchronization pull-in range of the PLL circuit, and that when the PLL circuit makes the pull-in operation, the synchronizing clock is also generated in synchronism with the reproduced signal.

Figure 4:
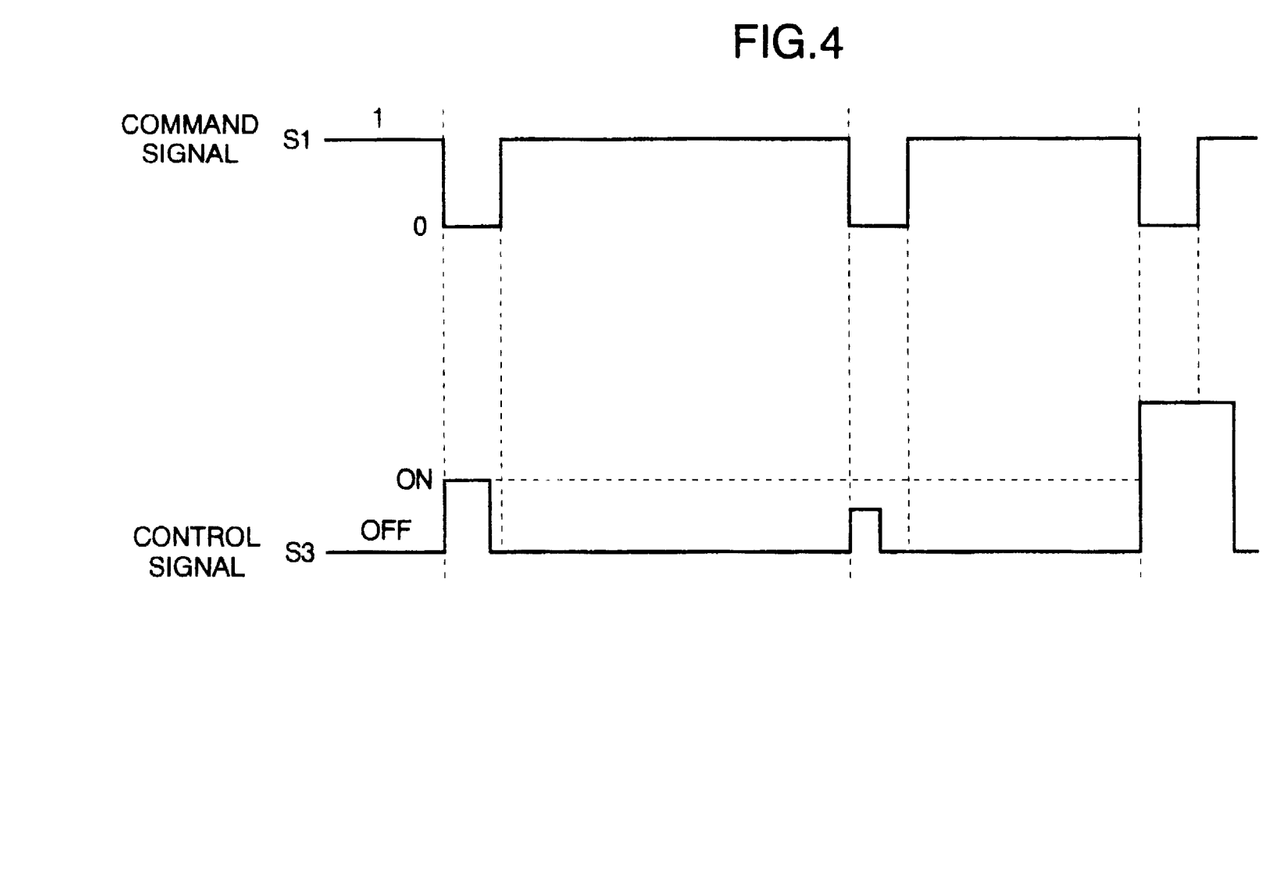
FIG. 4 is a diagram showing the relation between the command signal S1 and a control signal S3.

FIG. 4 is a diagram showing the relation between the command signal S1 and the control signal S3. The synchronized state discriminator 17 in FIG. 3 measures the maximum time width of the reproduced signal from the maximum time width detector 13, decides if the frequency is within the allowable synchronized range, and compares the frequency of the reproduced signal with the set value from the signal processor 9. Thus, similarly as in the first embodiment, when the frequency of the reproduced signal is within the allowable synchronized range and when it is smaller than the set value, the discriminator 17 produces the command signal S1 of "1". Contrary, when the frequency is out of the allowable synchronized range and larger than the set value, the discriminator 17 produces the command signal S1 of "0".

The revolution rate of the spindle motor 2 is detected as an analog rotation signal by the encoder 19, and converted into a binary value by the waveform shaper 20. The binary value is detected as a revolution signal by the revolution detector 21. The revolution signal is supplied to the spindle controller 18b.

The spindle controller 18b responds to the command signal S1 to produce the spindle control signal S3 of "OFF" when the command signal S1 is "1". When the command signal S1 is "0", the spindle controller 18b produces the spindle control signal S3 of "ON". In addition, the spindle controller 18b changes the peak-to-peak value or driving time of the spindle control signal or changes both at a time in response to the revolution rate signal, thereby controlling the spindle motor to rotate until a certain revolution is reached.

Figure 5:
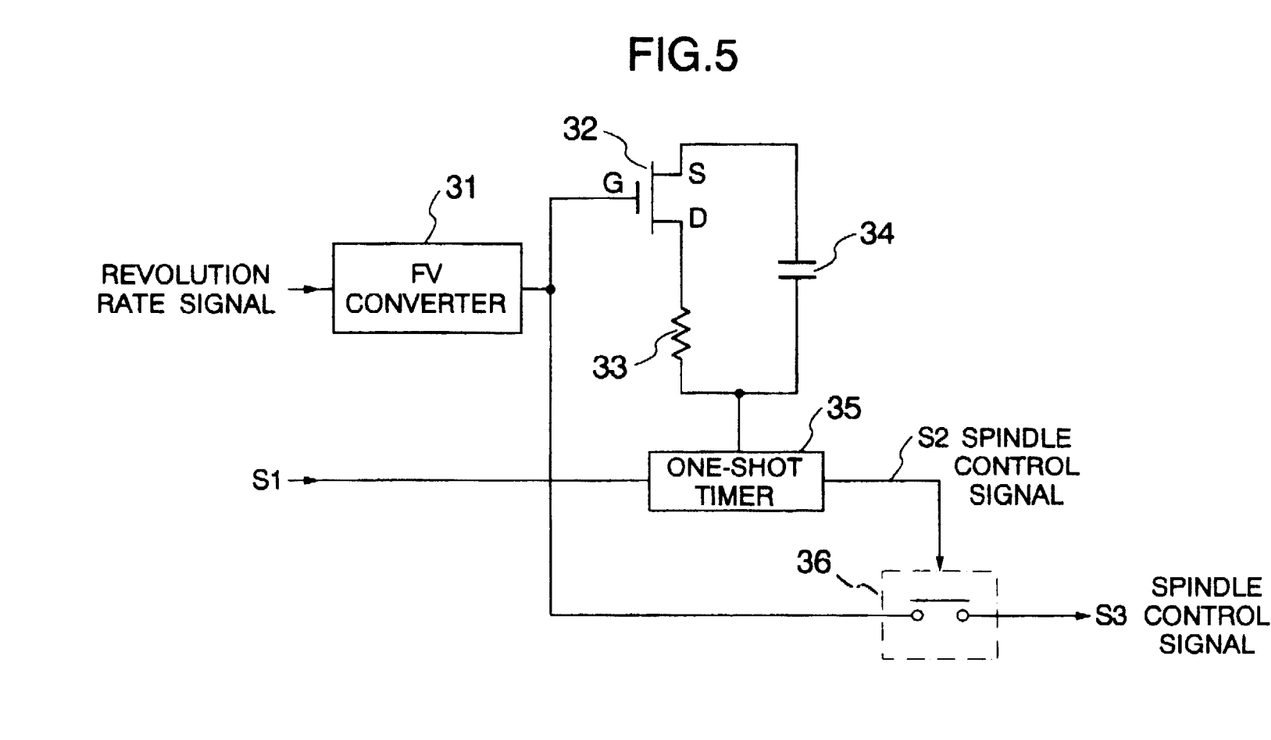
FIG. 5 is a diagram showing the principle of the control for the peak-to-peak value and driving time.

An example of the control of the peak-to-peak value and/or driving time in the spindle controller 18b will be described below. FIG. 5 shows the principle under which the peak-to-peak value and/or driving time are controlled. In FIG. 5, the revolution rate signal is once converted into a voltage signal corresponding to the revolution rate by an FV converter 31, and supplied to the gate of an FET 32. The source-drain resistance of the FET 32 is changed by the gate voltage. Since a capacitor 34 is connected in parallel to a series circuit of the source-drain resistance and a resistor 33, the time constant of the CR circuit is changed in accordance with the revolution rate signal.

In addition, a one-shot timer 35 is provided to trigger the command signal S1. The timer element is operated on the CR time constant of FET 32, resistor 33 and capacitor 34 so as to produce the spindle control signal S2. Thus, the driving time of the spindle control signal S2 is changed on the basis of the revolution signal.

The voltage signal from the FV converter 31 is also supplied to an analog switch 36 and thus controlled to pass therethrough only during the period of the spindle control signal S2. The voltage signal passed through the analog switch 36 is supplied as the spindle control signal S3 to the spindle driver 8. Thus, the spindle control signal S3 has the peak-to-peak value and/or driving time changed in response to the revolution rate signal.

According to the second embodiment of the invention, since the spindle motor 2 can be intermittently driven to rotate, and since the driving operation of the motor 2 is controlled by changing the peak-to-peak value and/or driving time of the driving signal in response to the current revolution rate of the spindle motor 2, the spindle motor 2 can be more precisely controlled to rotate with its consumption power greatly reduced.

It will be obvious that the driving period in the intermittent driving operation can be reduced more with the increase of the width of the allowable synchronized range in the combination of the synchronizing clock generator 6 and the synchronized state discriminator 17, thus leading to more reduction of the consumption power.

Figure 6:
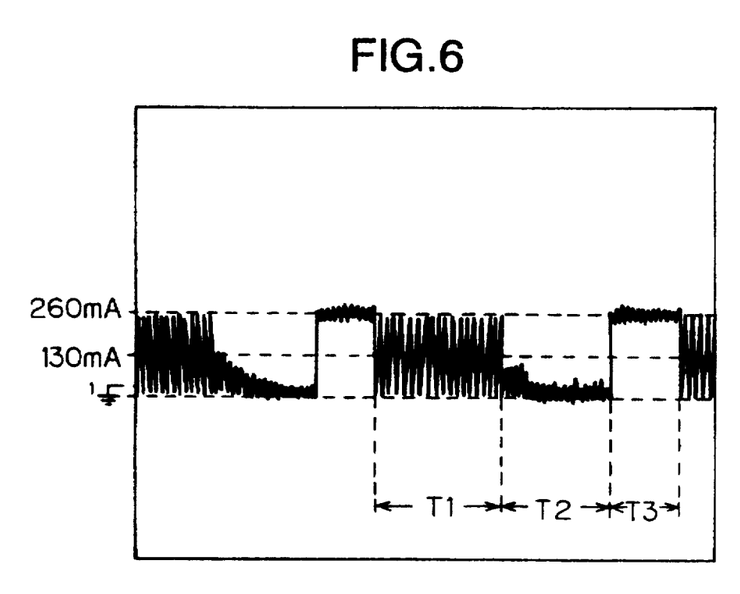
FIG. 6 is a diagram showing the drive current in the spindle motor.

Incidentally, the result of reducing the consumption power will be described with reference to FIG. 6. FIG. 6 shows the driving current in the spindle motor 2. In FIG. 6, the period T1 indicates the stationary rotation under the servo control, the period T2 the rotation by inertia with the servo control turned off, and the period T3 the accelerated rotation with the servo control turned on. This example corresponds to the embodiment 1, since the servo control is simply turned on and off. In addition, it can be seen that the consumption current is 130 mA in the period T1, and 260 mA in the period T3. Thus, the consumption power reduction effect is 25%.

The optical disk driving apparatus according to the invention, as described above, includes the synchronizing clock generator for generating the clock in synchronism with the reproduced signal, the synchronized state discriminator for deciding if the frequency of the reproduced signal is within the synchronized range, and the spindle controller for controlling the spindle motor to be stopped from being driven, thus left running by inertia when the frequency of the reproduced signal is within the synchronized range, but controlling the spindle motor to be accelerated and pulled in the synchronized range immediately before the frequency goes out of the synchronized range.

Thus, when the frequency of the reproduced signal is within the synchronized range, the spindle motor can be stopped from being driven, thus left running by inertia, but immediately before the frequency goes out of the synchronized range, the spindle motor can be driven to accelerate.

Therefore, the consumption power in the optical disk driving apparatus can be greatly reduced by intermittently driving the spindle motor.

The synchronized state discriminator 17 in the above apparatus is constructed to decide if the frequency of the reproduced signal is within a certain allowable synchronized range that is slightly narrower than the synchronized range including the margin of the operation of all the synchronizing clock generator 6 and PLL circuit, and produce the command signal. The reason is that in order to reproduce a large amount of data at high speed, data must be started to be read immediately after the data read command is received, thereby reducing the delay of the response to the minimum.

Thus, the reduction of the consumption power can be performed by allowing the change of the revolution rate exceeding the synchronized range and extending the driving pause time of the spindle motor 2 when there is no access to data for a while.

For the above case, instead of deciding if the frequency of the reproduced signal is within the allowable synchronized range, the access pause period can be always checked or detected for the application to the driving pause control of the spindle motor 2 described in the invention. This application will be well known by those skillful in the art, and thus will not be described in detail.

What is claimed is:

1. A disk driving method comprising an information reading step for reading information from a disk, a reproducing step for reproducing data from the read information to produce a reproduced signal, and a rotation driving step for driving said disk to rotate at a necessary revolution rate, said method further comprising:

a synchronizing clock generating step for generating a synchronizing clock from the reproduced signal obtained by said reproducing step;

a synchronized state discriminating step for making a decision as to whether a frequency of said reproduced signal is within a predetermined allowable synchronized range that is narrower than a synchronized range necessary for maintaining synchronization, and for producing a command signal representing a result of the decision; and a spindle controlling step for stopping said rotation driving step so as to make inertial rotation when the command signal indicates that the frequency of said reproduced signal is within said allowable synchronized range, but executing said rotation driving step to cause the frequency of said reproduced signal to be pulled into said allowable synchronized range when the command signal indicates that the frequency of said reproduced signal is out of said synchronized range.

2. A disk driving method according to claim 1, wherein: the disk is an optical disk having information pits; and the information reading step comprises irradiating a laser beam on the optical disk and following the information pits on the optical disk.

3. A disk driving apparatus comprising a pickup unit for reproducing information from a disk to produce a reproduced signal, rotation drive means for controlling said disk to rotate at a predetermined revolution rate, and signal processing means for controlling the whole disk driving apparatus, said apparatus further comprising:

synchronizing clock generating means for generating a synchronizing clock from said reproduced signal;

synchronized state discriminating means for making a decision as to whether a frequency of said reproduced signal is within an allowable synchronized range that is narrower than a synchronized range necessary for maintaining synchronization, and producing a command signal representing a result of said decision; and spindle control means for controlling the rotation drive means to be stopped from being driven and thereby left running by inertia when the command signal indicates that the frequency of said reproduced signal is within said allowable synchronized range, but controlling said rotation drive means to be driven so that the frequency of said reproduced signal is pulled into said allowable synchronized range when the command signal indicates that the frequency of said reproduced signal is out of said allowable synchronized range.

4. A disk driving apparatus according to claim 3, wherein:

the disk is an optical disk; and the pickup unit comprises:

an optical unit for irradiating a laser beam on the optical disk and converting a portion of the laser beam which is reflected from the optical disk into an electric signal;

a driving unit for moving the optical unit in a radius direction of the optical disk and in a normal direction to a recording surface of the optical disk;

reproduced signal detecting means for amplifying the electric signal to produce the reproduced signal; and servo control means for controlling the driving unit to move the optical unit such that the laser beam is focused on the optical disk.

5. A disk driving apparatus comprising a pickup unit for reproducing information from a disk to produce a reproduced signal, rotation drive means for controlling said disk to rotate at a predetermined revolution rate, and signal processing means for controlling the whole disk driving apparatus, said apparatus further comprising:

synchronizing clock generating means for generating a synchronizing clock from said reproduced signal;

synchronized state discriminating means for making a decision as to whether a frequency of said reproduced signal is within a specified allowable range set by said signal processing means, and producing a command signal representing a result of said decision; and spindle control means for controlling the rotation drive means to be stopped from being driven and thereby left running by inertia when the command signal indicates that the frequency of said reproduced signal is within said specified allowable range, but controlling said rotation drive means to be driven so that the frequency of said reproduced signal is pulled into said specified allowable range when the command signal indicates that the frequency of said reproduced signal is out of said specified allowable range.

6. A disk driving apparatus according to claim 5, wherein:

the disk is an optical disk; and the pickup unit comprises:

an optical unit for irradiating a laser beam on the optical disk and converting a portion of the laser beam which is reflected from the optical disk into an electric signal;

a driving unit for moving the optical unit in a radius direction of the optical disk and in a normal direction to a recording surface of the optical disk;

reproduced signal detecting means for amplifying the electric signal to produce the reproduced signal; and servo control means for controlling the driving unit to move the optical unit such that the laser beam is focused on the optical disk.

7. A disk driving apparatus comprising a pickup unit for reproducing information from a disk to produce a reproduced signal, rotation drive means for controlling said disk to rotate at a predetermined revolution rate, and signal processing means for controlling the whole disk driving apparatus, said apparatus further comprising:

synchronizing clock generating means for generating a synchronizing clock from said reproduced signal;

rotation rate detecting means for detecting a rotation of the rotation drive means and producing a rotation rate signal indicating a rate of the rotation;

synchronized state discriminating means for making a decision as to whether a frequency of said reproduced signal is within an allowable synchronized range that is narrower than a synchronized range necessary for maintaining synchronization and also as to whether the frequency of said reproduced signal is within a specified allowable range set by said signal processing means, and producing a command signal indicating a result of the decision; and spindle control means for controlling the rotation drive means to be stopped from being driven and thereby left running by inertia when the command signal indicates that the frequency of said reproduced signal is within said allowable synchronized range and within said specified allowable range, but controlling said spindle motor to be driven so that the frequency of said reproduced signal is pulled into both said allowable synchronized range and said specified allowable range when the command signal indicates that frequency of said reproduced signal is out of said allowable synchronized range or out of said specified allowable range.

8. A disk driving apparatus according to claim 7, wherein said spindle control means comprises means for changing a peak-to-peak value of a driving output for driving the rotation drive means on the basis of said revolution rate signal.

9. A disk driving apparatus according to claim 8, wherein:

the disk is an optical disk; and the pickup unit comprises:

an optical unit for irradiating a laser beam on the optical disk and converting a portion of the laser beam which is reflected from the optical disk into an electric signal;

a driving unit for moving the optical unit in a radius direction of the optical disk and in a normal direction to a recording surface of the optical disk;

reproduced signal detecting means for amplifying the electric signal to produce the reproduced signal; and servo control means for controlling the driving unit to move the optical unit such that the laser beam is focused on the optical disk.

10. A disk driving apparatus according to claim 7, wherein said spindle control means comprises means for changing a driving time of a driving output for driving the rotation drive means on the basis of said revolution rate signal.

11. A disk driving apparatus according to claim 10, wherein:

the disk is an optical disk; and the pickup unit comprises:

an optical unit for irradiating a laser beam on the optical disk and converting a portion of the laser beam which is reflected from the optical disk into an electric signal;

a driving unit for moving the optical unit in a radius direction of the optical disk and in a normal direction to a recording surface of the optical disk;

reproduced signal detecting means for amplifying the electric signal to produce the reproduced signal; and servo control means for controlling the driving unit to move the optical unit such that the laser beam is focused on the optical disk.

12. A disk driving apparatus according to claim 7, wherein:

the disk is an optical disk; and the pickup unit comprises:

an optical unit for irradiating a laser beam on the optical disk and converting a portion of the laser beam which is reflected from the optical disk into an electric signal;

a driving unit for moving the optical unit in a radius direction of the optical disk and in a normal direction to a recording surface of the optical disk;

reproduced signal detecting means for amplifying the electric signal to produce the reproduced signal; and servo control means for controlling the driving unit to move the optical unit such that the laser beam is focused on the optical disk.

* * * * *